Patented Dec. 23, 1941

2,267,124

UNITED STATES PATENT OFFICE 2,267,124

LEUCO-SULPHURIC ACID ESTERS OF ANTHRAQUINONE - NAPHTHALENE - CARBAZOLES

Walter Mieg, Opladen, Franz Wieners, Cologne-Stammheim, Wilhelm Bauer, Leverkusen-Wiesdorf, and Bernhard Bollweg, Leverkusen-I. G. Werk, Germany No Drawing. Application March 22, 1939, Serial No. 263,392. In Germany March 24, 1938

3 Claims. (Cl. 260—316)

This invention relates to leuco-sulphuric acid esters of anthraquinone naphthalene carbazoles.

Leuco-sulphuric acid esters of vat dyestuffs of the anthrimide carbazole series are generally speaking useless for dyeing and printing purposes. When dyed or printed on goods and developed according to known methods the water-insoluble vat dyestuffs are not properly reformed. The dyeings obtained are dull and not clear and besides depart from those obtained with the vat dyestuffs themselves as regards fastness properties and shade.

According to this invention we have found that in contrast thereto leucosulphuric acid esters of vat dyestuffs of the anthraquinone naphthalene carbazole series yield strong bright clear dyeings of excellent fastness properties which do not only correspond but in many cases surpass the dyeings obtained with the vat dyestuffs themselves. More particularly leuco-sulphuric acid esters of this kind yield when developed on the fiber in a suited manner strong orange, brown to brownish-red shades, which could not be obtained hitherto in the same fastness properties with the known leuco-sulphuric acid esters. As the leuco sulphuric acid esters are usually employed as salts, for instance alkali metal or ammonium salts, the appended claims are intended to cover the free leuco sulphuric acid esters as well as the corresponding salts. Our new leuco esters, their salts respectively, represent therefore very valuable products.

The process for the manufacture of our new compounds consists in transforming anthraquinone naphthalene carbazoles into the corresponding leuco-sulphuric acid esters by reduction and esterification in the presence of a tertiary base by means of sulphur trioxide or agents capable of splitting off sulphur trioxide according to known methods. The anthraquinone naphthalene carbazoles used as starting materials may contain substituents which do not effect solubility, for instance in the naphthalene as well as in the anthraquinone residue or in both, such as halogens, aroylamino or alkoxy groups. They can be obtained from the corresponding naphthylamino anthraquinones according to the known carbazolizing methods, for instance by the action of acid condensing agents as described in the U. S. Patent 2,149,064 or according to the method described by Ullmann in "Berichte der Deutschen Chemischen Gesellschaft" 47, 1914, page 380.

The following examples illustrate the invention without, however, restricting it thereto, the parts being by weight:

Example 1

200 parts of chlorosulphonic acid are added with stirring to 1000 parts of pyridine at 20–30° while cooling. The air is removed by nitrogen, and 100 parts of monobromo-3.4-benzo-7.8-phthaloylcarbazole and 60 parts of copper powder are added. The whole is heated with continual stirring for about 4 hours at 40–45° nitrogen being passed over the reaction mixture. Then the whole is cooled and poured into ice-water whereby the pyridinium salt of the ester is precipitated. The salt is separated and converted into the soluble sodium salt by weakly heating with diluted soda lye. The alkaline solution is filtered, freed from the pyridine in vacuo and salted out with sodium chloride. The separated sodium salt of the leuco ester is filtered with suction, washed with dilute sodium chloride solution containing soda and dried. It forms a yellowish powder, being easily soluble in water. When adding a weak oxidizing agent, for example nitrite or ferric chloride, and a mineral acid to the aqueous solution, then the dyestuff separates in orange-brown flakes. The ester yields, dyed or printed and developed in a suited manner, clear orange shades of excellent fastness properties especially to chlorine, light and boiling.

It corresponds to the following formula

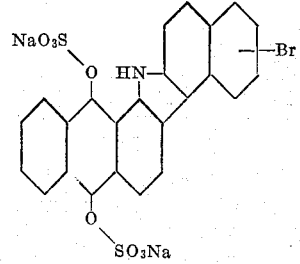

When started from 3.4-benzo-7.8-phthaloylcarbazole a leuco-sulphuric acid ester is obtained yielding on the textile fiber orange shades of about the same fastness properties.

Example 2

25 parts of anthraquinone-2.1-(N)-1'.2'-(N)-5-benzoylamino-naphthalene-carbazole (obtained by carbazolization of 5-benzoylamino-1.2'-naphthylamino-anthraquinone) and 17.5 parts of copper powder are added to a mixture consisting of 250 parts of pyridine and 50 parts of chlorosulphonic acid methyl-ester. Previously the air has been removed by carbon dioxide. The mixture is heated with stirring for 3 hours at 40–50°, carbon dioxide being passed over the surface. When cool the reaction mixture is poured into ice-water, the precipitated ester-pyridinium salt filtered with suction, washed with ice-water and dissolved while weakly heating in diluted soda lye having an addition of alcohol. The solution is filtered, traces of pyridine are removed in vacuo and the clear solution salted out by means of sodium chloride. The ester obtained in a very good yield has the following formula

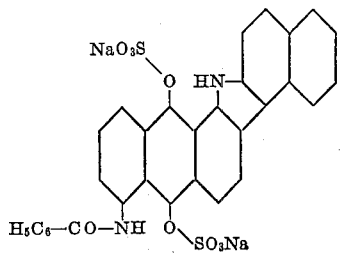

It dissolves in water with a yellowish color and yields fixed on the textile fiber and oxidized very clear brown shades of excellent fastness properties.

*Example 3*

To a mixture consisting of 35 parts of SO₃ and 300 parts of dry pyridine are added 30 parts of anthraquinone -2.1-(N)-1'.2'-(N)-4- benzoylamino-naphthalene-carbazole (obtained by carbazolization of 4-benzoylamino-1.2'-naphthylamino-anthraquinone). The reaction mixture is heated with stirring for 2 hours at 40°, carbon dioxide being passed over the surface. Then the mixture is poured into ice-water, the precipitated pyridinium salt of the leuco sulphuric ester is filtered with suction and converted into the corresponding sodium salt as described in Example 2. The ester has the following formula

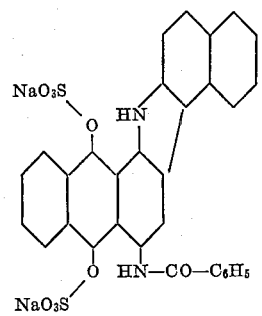

It yields on the textile fiber brownish-Bordeaux-red shades of excellent fastness properties.

*Example 4*

By using instead of anthraquinone-2.1-(N)-1'.2'-(N)-4-benzoylamino-naphthalene-carbazole of Example 3 the equivalent amount of an anthraquinone - 2.1-(N)-1'.2'-(N)-4 - benzoylamino-chloro-naphthalene-carbazole the ester of the following formula

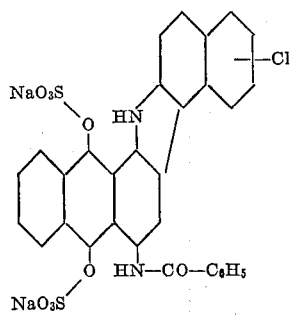

is obtained, which yields on the textile fiber in usual manner developed a reddish-brown of excellent fastness properties.

The chloro-carbazole is obtained by stirring for several hours the carbazole employed as starting material in Example 3 with sulphuryl chloride at 10° in nitrobenzene suspension.

We claim:

1. The leucosulphuric acid ester of monobromo-anthraquinone -2.1-(N)-1'.2'-(N)- naphthalene-carbazole having the following formula

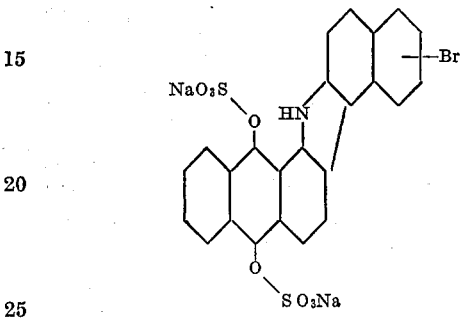

2. The leucosulphuric acid ester of monochloro-anthraquinone -2.1-(N)-1'.2'-(N)-4- benzoylamino-naphthalene-carbazole having the following formula

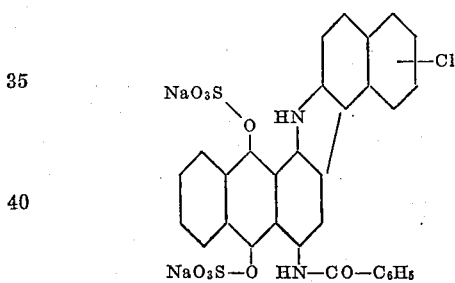

3. Leucosulphuric acid esters of anthraquinone-2.1-N-1'.2'-N-naphthalene carbazoles having the following formula:

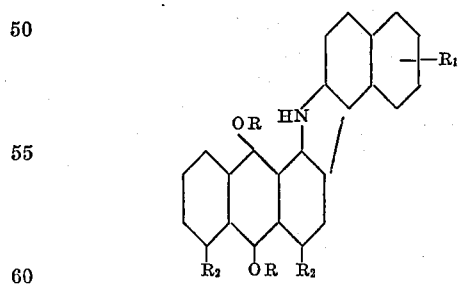

wherein OR stands for a sulphuric acid ester radical, R₁ stands for halogen, and R₂ stands for a member of the group consisting of hydrogen and a benzoylamino group.

WALTER MIEG.
FRANZ WIENERS.
WILHELM BAUER.
BERNHARD BOLLWEG.